United States Patent [19]
Busch

[11] Patent Number: 5,286,091
[45] Date of Patent: Feb. 15, 1994

[54] PASSIVE SEAT BELT SYSTEM INTEGRATED WITH A SEAT

[75] Inventor: Craig A. Busch, Armada, Mich.

[73] Assignee: TRW Vehicle Safety Systems Inc., Lyndhurst, Ohio

[21] Appl. No.: 877,470

[22] Filed: May 1, 1992

[51] Int. Cl.$^5$ .............................................. B60R 21/02
[52] U.S. Cl. ...................................... 297/487; 297/464
[58] Field of Search ............... 297/487, 488, 464, 469; 280/802, 751

[56] References Cited

U.S. PATENT DOCUMENTS

| | | | |
|---|---|---|---|
| 2,755,101 | 7/1956 | Budde | 297/487 X |
| 3,613,819 | 10/1971 | Maloney | 280/802 X |
| 3,653,714 | 4/1972 | Gentile | 280/802 X |
| 3,717,216 | 2/1973 | Rothschild | 280/802 X |
| 3,781,061 | 12/1973 | Walz et al. | 280/802 X |
| 3,794,135 | 2/1974 | Ewert et al. | 280/802 |
| 3,901,550 | 8/1975 | Hamy | 297/390 |
| 4,619,468 | 10/1986 | Spill | 297/488 X |

FOREIGN PATENT DOCUMENTS

| | | | |
|---|---|---|---|
| 2207091 | 9/1973 | Fed. Rep. of Germany | 297/487 |
| 0921911 | 4/1982 | U.S.S.R. | 280/802 |

Primary Examiner—Peter R. Brown
Assistant Examiner—Milton Nelson, Jr.
Attorney, Agent, or Firm—Tarolli, Sundheim & Covell

[57] ABSTRACT

An arm assembly is movable from a stowed position adjacent one side of a vehicle seat toward the occupant to restrain the occupant in the seat and movable away from the occupant to the stowed position. The arm assembly has a first length when in the stowed position and a second length when restraining the occupant. The first length when the arm assembly is in the stowed position is less than the second length of the arm assembly when restraining the occupant. A motor-driven linear actuator moves the arm assembly from and to the stowed position.

10 Claims, 5 Drawing Sheets

PASSIVE SEAT BELT SYSTEM INTEGRATED WITH A SEAT

BACKGROUND OF THE INVENTION

1. Technical Field

The present invention relates to a passive seat belt system for use in a vehicle, and particularly relates to a passive seat belt system integrated with a seat of a vehicle.

2. Background Art

A known passive seat belt system integrated with a vehicle seat is disclosed in U.S. Pat. No. 3,794,135. The seat belt system of U.S. Pat. No. 3,794,135 includes an articulated lap belt. The articulated lap belt has a plurality of hollow segment members hingedly connected to each other. A spring strip passes through the hollow segment members. When tension is applied to the spring strip, the hollow segment members pivot relative to each other to bring the articulated lap belt around the occupant. When tension is released from the spring strip, the hollow segment members pivot relative to each other and the articulated lap belt moves away from the occupant.

Another known passive seat belt system integrated with a vehicle seat is disclosed in U.S. Pat. No. 3,901,550. The seat belt system of U.S. Pat. No. 3,901,550 includes a pair of upper guard arms and a pair of lower guard arms. The upper and lower guard arms cooperate to restrain an occupant seated in a vehicle seat. A spring strip is attached to a guard arm and urges the guard arm to a straight stored position when the guard arm is not in use. One end of a tension strap is attached to the guard arm. The other end of the tension strap is secured to a reel. A drive winds the tension strap onto the reel to bend the guard arm around an occupant seated in the vehicle seat.

SUMMARY OF THE INVENTION

In accordance with the present invention, an apparatus restrains an occupant in a seat of a vehicle. The apparatus comprises an arm movable from a stowed position adjacent one side of the seat toward the occupant to restrain the occupant in the seat. The arm is also movable away from the occupant to the stowed position. The arm includes a plurality of links interconnected end-to-end. The links are pivotable relative to each other and movable longitudinally relative to each other. The links pivot and move longitudinally relative to each other in one direction as the arm moves away from the occupant to the stowed position. The links pivot and move longitudinally relative to each other in the opposite direction as the arm moves from the stowed position toward the occupant to restrain the occupant in the seat.

The arm has a first length when in the stowed position and a second length when restraining the occupant. The first length is less than the second length because the links are longitudinally contracted relative to each other when the arm is in the stowed position and are longitudinally extended relative to each other when the arm is restraining the occupant. Preferably, a motor-driven linear actuator operatively coupled with the arm moves the arm from and to the stowed position.

BRIEF DESCRIPTION OF THE DRAWINGS

The foregoing and other features of the present invention will become apparent to one skilled in the art to which the present invention relates upon a consideration of the following description of the invention with reference to the accompanying drawings, wherein.

DESCRIPTION OF PREFERRED EMBODIMENT

Figure 1:
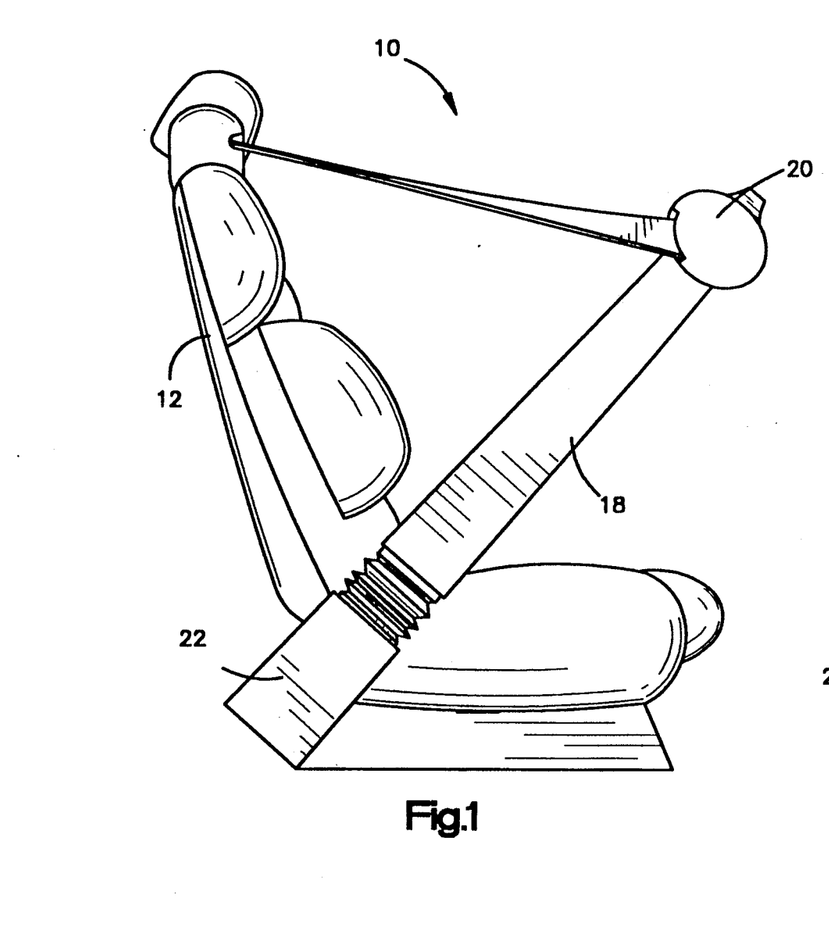
FIG. 1 is a side view illustrating a seat belt system of the present invention integrated with a seat and in a stowed position.
Figure 2:
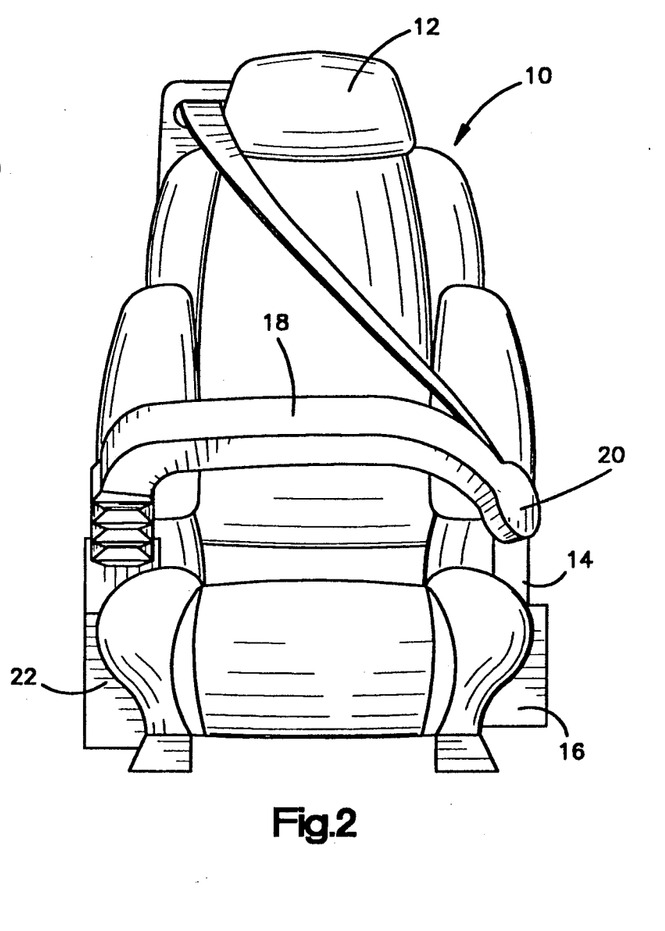
FIG. 2 is a front view illustrating the seat belt system of FIG. 1 in an occupant restraining position.
Figure 7:
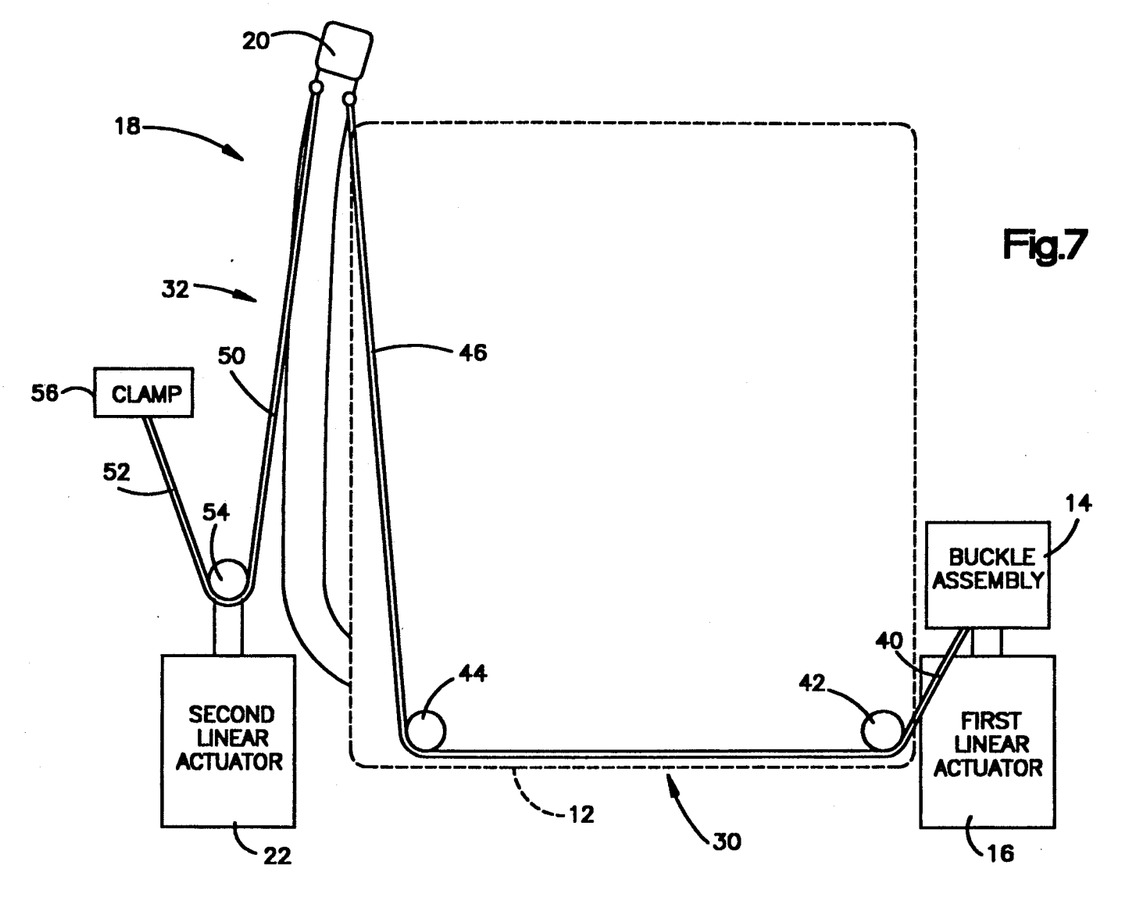
FIG. 7 is a schematic block diagram of the seat belt system in the stowed position of FIG. 1.

As representative of the present invention, FIGS. 1-2 and 7 illustrate a seat belt system 10 integrated with a seat 12 of a vehicle. The seat belt system 10 includes a buckle assembly 14 secured to the seat 12 of the vehicle. The buckle assembly 14 is located on the outboard side of the seat 12. A first linear actuator 16 is secured to the outboard side of the seat 12 and is operatively coupled with the buckle assembly 14 for moving the buckle assembly 14 between a stored position and a non-stored position. The non-stored position of the buckle assembly 14 is away from the first linear actuator 16 and the stored position of the buckle assembly 14 is toward the first linear actuator 16.

The first linear actuator 16 is controlled to operate in opposite directions. One direction of operation of the first linear actuator 16 corresponds to the direction of movement of the buckle assembly 14 towards its non-stored position. The other direction of operation of the first linear actuator 16 corresponds to the direction of movement of the buckle assembly 14 towards its stored position. As shown in FIG. 7, the buckle assembly 14 is in its stored position. The first linear actuator 16 may be an electromechanical linear actuator in the Electrak 1 Series manufactured by Warner Electric, Motion Control Systems Division, located in Marengo, Ill.

The seat belt system 10 further includes an arm assembly 18. The arm assembly 18 is movable from a stowed position as shown in FIG. 1 to a restraining position as shown in FIG. 2. The arm assembly 18 has a first length when it is in its stowed position. The arm assembly 18 has a second length when it is in its restraining position. The first length of the arm assembly 18 is less than the second length of the arm assembly 18. A latch assembly 20 is attached at one end of the arm assembly 18. The other end of the arm assembly 18 is fixed to a portion of the seat 12 of the vehicle.

A second linear actuator 22 is secured to the inboard side of the seat 12 and is operatively coupled with the arm assembly 18 for moving the arm assembly 18 between its stowed position and its restraining position, in a manner to be described later. The second linear actuator 22 is controlled to operate in opposite directions. One direction of operation of the second linear actuator 22 corresponds to the direction of movement of the arm assembly 18 towards its stowed position. The other direction of operation of the second linear actuator 22 corresponds to the direction of movement of the arm assembly 18 towards its restraining position. As shown in FIG. 7, the arm assembly 18 is in its stowed position. Like the first linear actuator 16, the second linear actuator 22 may also be an electromechanical linear actuator in the Electrak 1 Series manufactured by Warner Electric, Motion Control Systems Division, located in Marengo, Ill.

Figure 3:
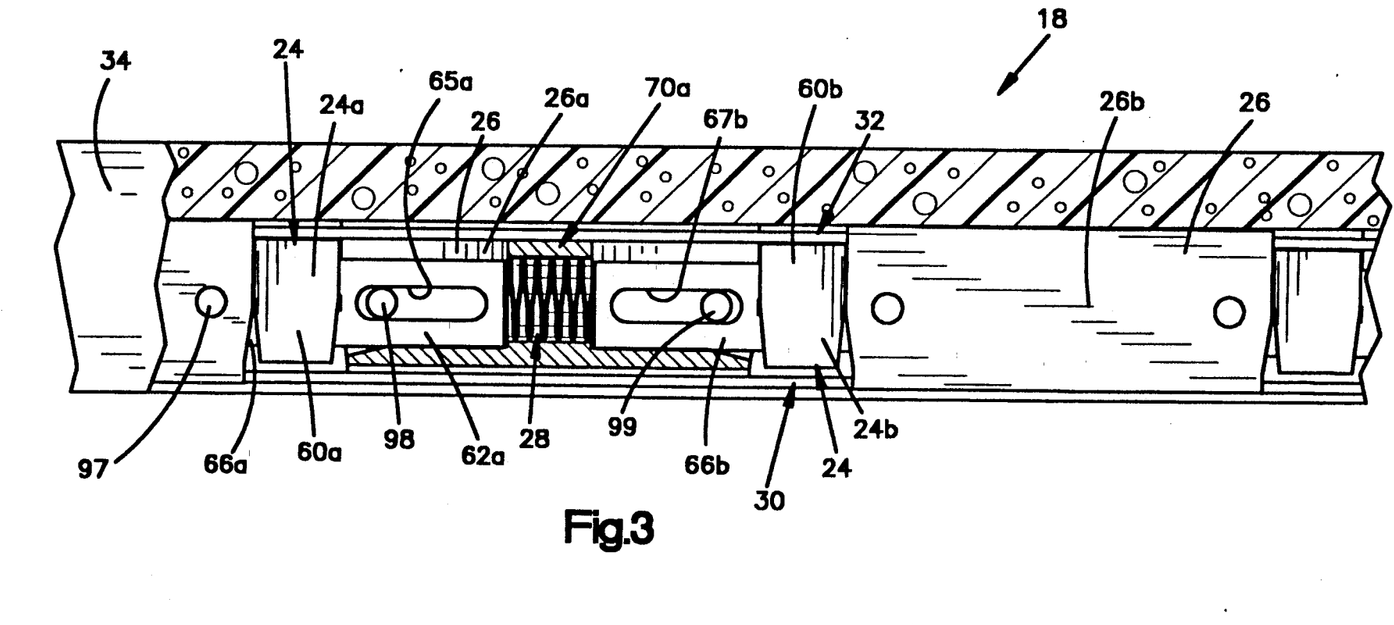
FIG. 3 is an enlarged view, partly in section, of a portion of an arm assembly embodied in the seat belt system of the present invention.

Referring to FIG. 3, the arm assembly 18 includes a plurality of links interconnected end-to-end. The plurality of links includes a plurality of male segments 24 connected alternately with a plurality of female segments 26. Preferably, each of the male and female segments 24, 26 is made of high-impact, wear-resistant material such as that sold under the brand name Delrin manufactured by E. I. DuPont de Nemours & Co., located in Wilmington, Del.

In FIG. 3, two of the male segments 24 are individually labelled with reference numerals 24a and 24b. The specific construction of each of the male segments 24 is the same. For simplicity, only the male segment 24a is illustrated in detail in FIG. 4.

Figure 4:
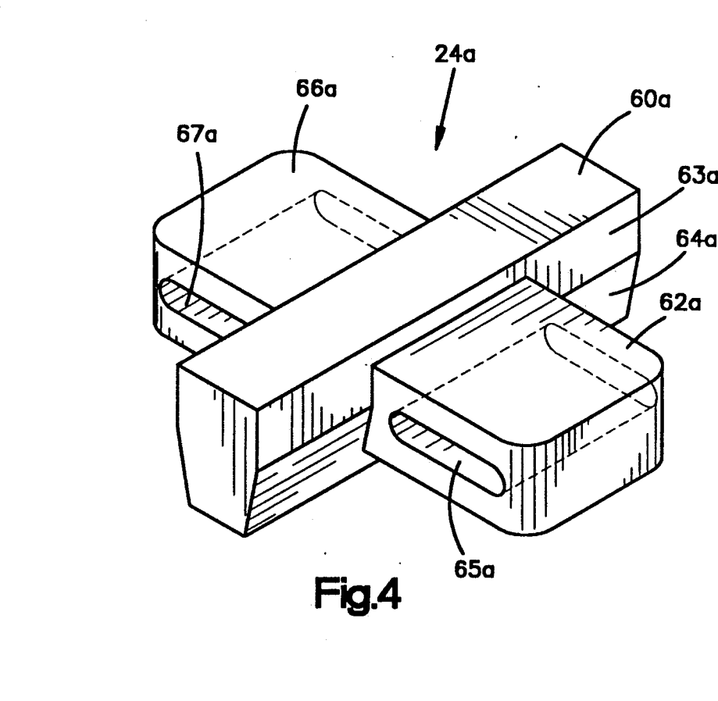
FIG. 4 is a perspective view of one linkage component used in the arm assembly of FIG. 3.

Referring to FIGS. 3 and 4, the male segment 24a includes a central portion 60a interconnecting two opposite end portions 62a, 66a. The central portion 60a has a first surface 63a and a second surface 64a which both face the end portion 62a. The second surface 64a is angled relative to the first surface 63a. The end portion 62a has an elongated slot 65a, which extends transversely through the end portion 62a for receiving a retaining pin 98 (shown in FIG. 3). The central portion 60a has similar first and second surfaces (not shown) which face the end portion 66a. The end portion 66a also has an elongated slot 67a for receiving a retaining pin 97 (shown in FIG. 3) similar to the retaining pin 98.

Similarly, in FIG. 3, two of the female segments 26 are individually labelled with reference numerals 26a and 26b. The specific construction of each of the female segments 26a, 26b is the same. For simplicity, only the female segment 26a is illustrated in detail in FIG. 5.

Figure 5:
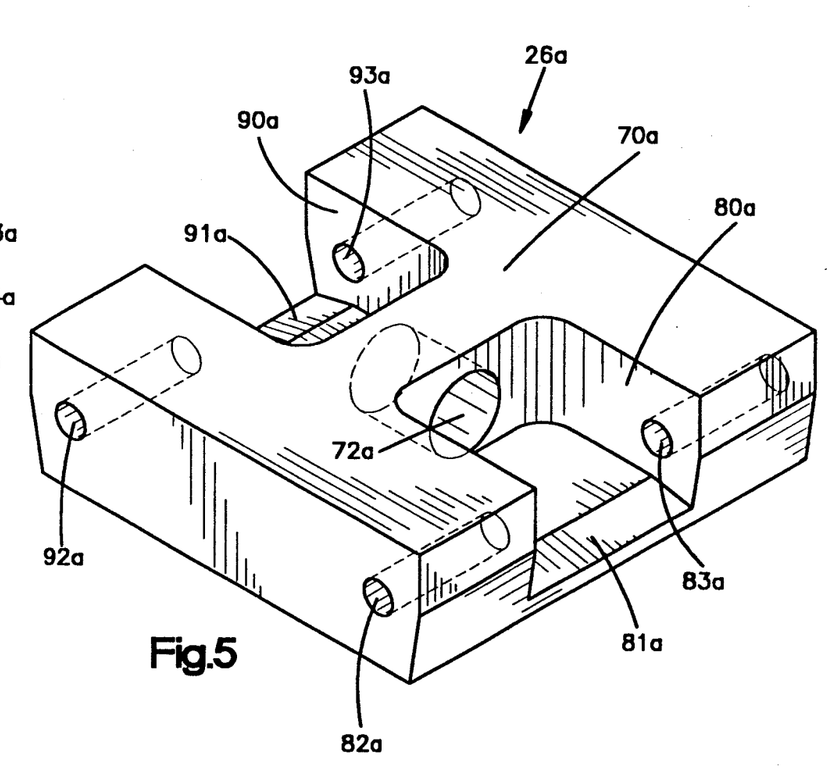
FIG. 5 is a perspective view of another linkage component used in the arm assembly of FIG. 3.

Referring to FIGS. 3 and 5, the female segment 26a includes a central portion 70a having a bore 72a which extends lengthwise of the female segment 26a and through the central portion 70a for receiving a spring 28. Opening 80a and opening 90a are located at opposite ends of the bore 72a. The openings 80a, 90a both open upward and away from the central portion 70a. A tapered surface 81a is located at the bottom of the opening 80a adjacent an end of the female segment 26a. Two through-holes 82a, 83a communicate with the opening 80a for receiving a retaining pin 99 (shown in FIG. 3), which extends between the two holes 82a, 83a. Similarly, a tapered surface 91a is located at the bottom of the opening 90a adjacent the other end of the female segment 26a. Two through-holes 92a, 93a communicate with the opening 90a for receiving the retaining pin 98, which extends between the two holes 92a, 93a.

Referring to FIGS. 3, 4 and 5, assembly of the two male segments 24a, 24b with the female segment 26a is described below. The spring 28 is placed in the bore 72a of the female segment 26a. The end portion 62a of the male segment 24a is placed in the opening 90a of the female segment 26a. The retaining pin 98 is inserted through the holes 92a, 93a of the female segment 26a and the slot 65a of the male segment 24a to allow pivotal and longitudinal sliding movement of the end portion 62a in the opening 90a of the female segment 26a. Similarly, the end portion 66b (shown in FIG. 3 only) of the male segment 24b is placed in the opening 80a of the female segment 26a. The retaining pin 99 is inserted through the holes 82a, 83a of the female segment 26a and the slot 67b (shown in FIG. 3 only) of the male segment 24b to allow pivotal and longitudinal sliding movement of the end portion 66b in the opening 80a of the female segment 26a.

The two male segments 24a, 24b are located adjacent opposite ends of the female segment 26a and are spring-biased away from each other by the spring 28. More specifically, the spring 28 acts on the end portion 62a of the male segment 24a and on the end portion 66b of the male segment 24b to urge the male segments 24a, 24b apart from each other. Other male and female segments are interconnected in the same way.

Figure 6:
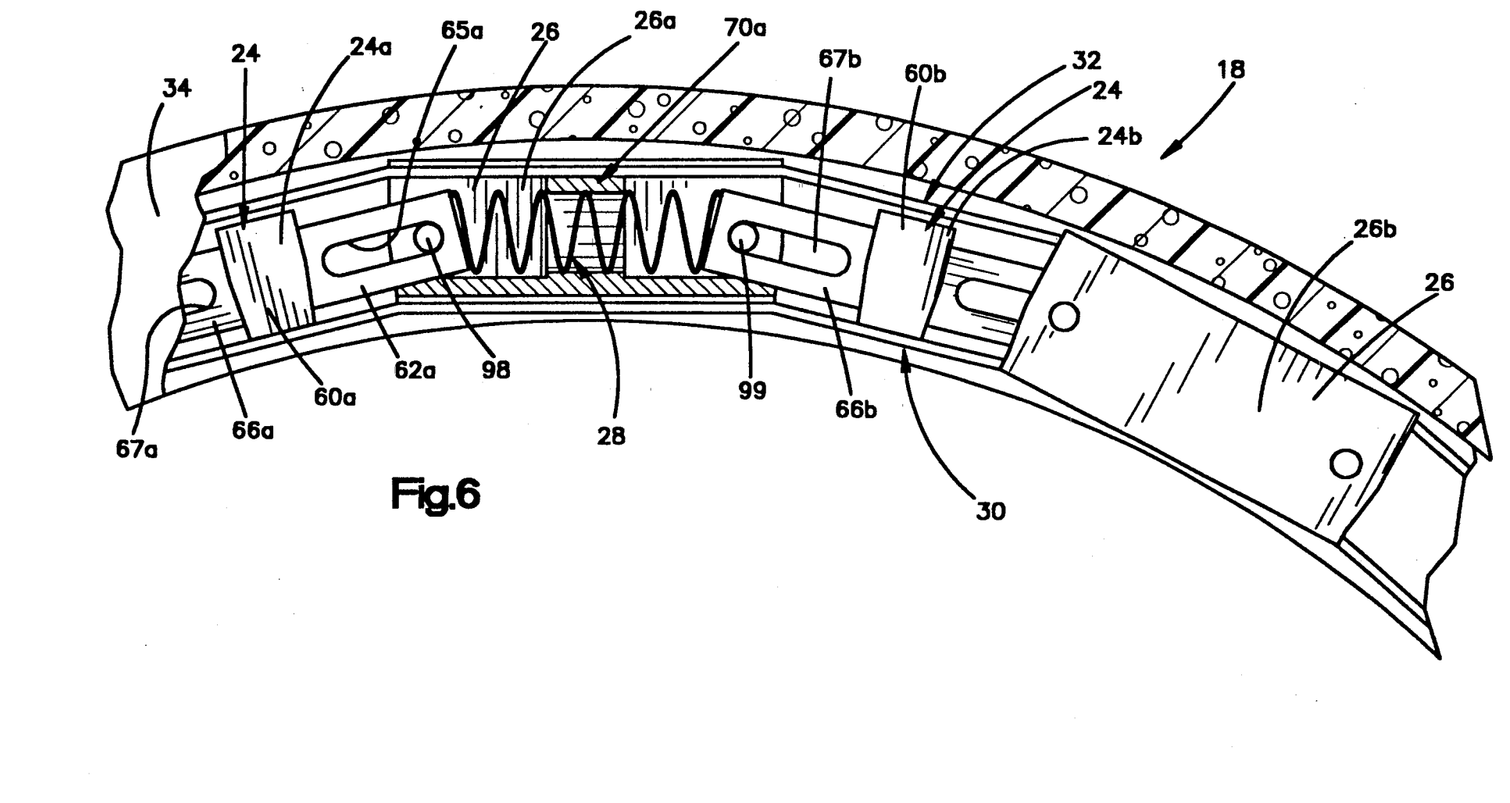
FIG. 6 is a view similar to FIG. 3 in which the arm assembly is shown in a position corresponding to the restraining position of the seat belt system illustrated in FIG. 2.

The male segments 24 and the female segments 26 are in longitudinally contracted or telescoped positions relative to each other, as shown in FIG. 3, when the arm assembly 18 is in its stowed position shown in FIG. 1. The male segments 24 and the female segments 26 are in longitudinally extended positions relative to each other, as shown in FIG. 6, when the arm assembly 18 is in its restraining position shown in FIG. 2. The male and female segments 24, 26 pivot and slide longitudinally relative to each other when they move between their longitudinally contracted positions shown in FIG. 3 and their longitudinally extended positions shown in FIG. 6.

The pivoting and the longitudinal sliding movements of the male and female segments 24, 26 relative to each other are effected by controlling movement of an inside strap 30 and an outside strap 32, which are shown in FIGS. 3 and 6. As schematically illustrated in FIG. 7, one end 40 of the inside strap 30 is fixed to the buckle assembly 14. From the buckle assembly 40, the inside strap 30 extends around a number of turning bars 42 and fixed pulleys 44 and through a channel (not shown) located under the seat 12. The inside strap 30 then extends through suitable guides (not shown) located on inside surfaces of the female segments 26. The inside strap 30 also extends through suitable guides (not shown) located on outside surfaces of the male segments 24. The other end 46 of the inside strap 30 is fixed to the end of the arm assembly 18 at which the latch assembly 20 is attached. Preferably, the inside strap 30 is made of nylon.

One end 50 of the outside strap 32 is also fixed to the end of the arm assembly 18 at which the latch assembly 20 is attached. The outside strap 32 extends through suitable guides (not shown) located on inside surfaces of the female segments 26. The outside strap 32 also extends through suitable guides (not shown) located on outside surfaces of the male segments 24. The outside strap 32 then extends around a movable pulley 54 operatively connected to the second linear actuator 22. The other end 52 of the outside strap 32 is fixed to a clamp 56 secured to the vehicle. Preferably, the outside strap 32 is made of nylon.

When the arm assembly 18 is in its stowed position as shown in FIGS. 1, 3 and 7, the second linear actuator 22 is in a position which pulls the outside strap 32 taut. When the outside strap is pulled taut, the male and female segments 24, 26 are fully contracted, as shown in FIG. 3, and pointed in a forward direction extending generally parallel with the inboard side of the seat 12.

As shown in FIGS. 3 and 6, a molded cover 34 encloses the male and female segments 24, 26 and the inside and outside straps 30, 32. The cover 34 is preferably made of an expanded foam material made by the process of reaction injection molding (RIM). The cover 34 is secured to only the male or female segment farthest away from the second linear actuator 22. This permits the male and female segments 24, 26 to contract and extend freely within the cover 34. The cover 34 also provides resistance to movement of the male and female segments 24, 26 so that the arm assembly 18 is less limber and moves less erratically.

A number of sensors and/or switches (not shown) are disposed at different locations around the seat 12 to provide signals indicative of certain vehicle seat conditions. For example, pressure switches are disposed along the length of the arm assembly 18 to detect respective pressures at the corresponding locations of the arm assembly 18 against an occupant in the seat 12. The signals from the pressure switches are monitored by a controller (not shown), such as a microprocessor, for providing control signals to each of the linear actuators 16, 22.

When the vehicle ignition is turned on or when the vehicle door is closed, the two linear actuators 16, 22 actuate. The first linear actuator 16 is actuated to operate in the direction to move the buckle assembly 14 from its stored position to its non-stored position. The second linear actuator 22 is actuated to operate in the direction to move the arm assembly 18 from its stowed position shown in FIGS. 1, 3 and 7 to its restraining position shown in FIGS. 2 and 6.

More specifically, with reference to FIG. 7, the second linear actuator 22 operates in the direction to move the pulley 54 away from the second linear actuator 22. When the pulley 54 moves away from the second linear actuator 22, slack is provided in the outside strap 32. When slack is provided in the outside strap 32, the male and female segments 24, 26 pivot and extend relative to each other due to their tendency to extend relative to each other. The male and female segments 24, 26 have a tendency to extend relative to each other because of the biasing force of the springs, such as the spring 28, located within the female segments 26. This biasing force acts between adjacent male segments to urge the male segments 24 apart from each other as previously described.

When the male and female segments 24, 26 extend relative to each other, the length of the arm assembly 18 is maximized to permit the arm assembly 18 to extend around a relatively large occupant in the seat 12. As the arm assembly 18 extends around the occupant in the seat 12, the latch assembly 20 moves toward the buckle assembly 14. Thus, the arm assembly 18 extends around the occupant in the seat 12 and the latch assembly 20 moves toward the buckle assembly 14 when the second linear actuator 22 operates in the direction to move the pulley 54 away from the second linear actuator 22.

At the same time the second linear actuator 22 is operated to move the pulley 54 away from the second linear actuator 22, the first linear actuator 16 is operated to move the buckle assembly 14 away from the first linear actuator 16 towards the latch assembly 20. Thus, while the arm assembly 18 is extending around the occupant and the latch assembly 20 is moving towards the buckle assembly 14, the buckle assembly 14 is moving towards the latch assembly 20. As the arm assembly 18 continues to extend around the torso of the occupant in the seat 12 and the latch assembly 20 and the buckle assembly 14 continue to move towards each other, the latch assembly 20 is eventually introduced into the buckle assembly 14 and locks with the buckle assembly 14.

After the latch assembly 20 is locked with the buckle assembly 14, each of the first and second linear actuators 16, 22 is signaled to operate in its opposite direction. When the first linear actuator 16 operates in its opposite direction, the buckle assembly 14 moves towards the first linear actuator 16. As the buckle assembly 14 moves towards the first linear actuator 16, slack is provided in the inner strap 30. When the second linear actuator 22 operates in the opposite direction, the pulley 54 moves towards the second linear actuator 22. When the pulley 54 moves towards the second linear actuator 22, slack is taken up in the outside strap 32 and the outside strap 32 becomes taut. When slack is provided in the inside strap 30 and the outside strap 32 becomes taut, the male and female segments 24, 26 in the arm assembly 18 contract to desired lengths of extension corresponding to desired pressure of the arm assembly 18 against the occupant in the seat 12 to restrain the occupant in the seat 12. Thus, the arm assembly 18 extends around the occupant and adjusts itself to desired pressure against the occupant to restrain the occupant in the seat 12 when either the vehicle ignition is turned on or the vehicle door is closed.

When the occupant desires to egress from the seat 12, some or all of the switches and/or sensors disposed at different locations around the seat 12 are activated so that the buckle assembly 14 unlocks and releases the latch assembly 20. At the same time the buckle assembly 14 unlocks and releases the latch assembly 20, the second linear actuator 22 operates in the direction to move the pulley 54 towards the second linear actuator 22 so as to pull the outside strap 32 taut. When the latch assembly 20 is released from the buckle assembly 14 and the outside strap 32 is pulled taut, the male and female segments 24, 26 pivot and longitudinally contract relative to each other. The male and female segments 24, 26 pivot and longitudinally contract relative to each other because the amount of tension in the outer strap 32 is sufficient to compress the springs, such as the spring 28, located within the female segments 26. When this occurs, the arm assembly 18 moves back to its stowed position as shown in FIGS. 1, 3 and 7 to allow the occupant to egress from the seat 12.

By interconnecting the male and female segments 24, 26 within the cover 34 and using the first and second linear actuators 16, 22 to control longitudinal extension and longitudinal contraction of the male and female segments 24, 26 in the manner described hereinabove, an improved seat belt system is provided and a number of advantages result. One advantage is that the seat belt system automatically positions, locks, and adjusts itself around the occupant in the seat 12. Another advantage is that the arm assembly 18 is less in the way of the occupant when the arm assembly 18 is in its stowed position since the arm assembly 18 has a shorter length in the stowed position than in the restraining position.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for restraining an occupant in a seat of a vehicle, said apparatus comprising:

an arm movable from a fully stowed position adjacent one side of the seat toward the occupant to restrain the occupant in the seat and movable away from the occupant to the fully stowed position, said arm having a first length when in the fully stowed position and a second length when restraining the occupant, said first length being less than said second length; and means for moving said arm from the fully stowed position toward the occupant and away from the occupant to the fully stowed position;

said arm including a plurality of links;

interconnecting means associated with each pair of adjacent links and for interconnecting an end of one link with an end of the other link to enable relative end-to-end movement of the adjacent links as said arm moves from the fully stowed position toward the occupant, each of said interconnecting means including a spring acting between the adjacent links and biasing the adjacent links away from each other to increase the length of said arm; and means for moving the ends of said links toward each other against the bias of said springs as said arm moves away from the occupant to decrease the length of said arm as said arm moves away from the occupant.

2. An apparatus for restraining an occupant in a seat of a vehicle as defined in claim 1 wherein said means for moving said arm includes a motor-driven linear actuator operatively coupled with said arm.

3. An apparatus for restraining an occupant in a seat of a vehicle as defined in claim 1 wherein said interconnecting means includes a retaining pin which is inserted through a hole formed in one of the adjacent links and a slot formed in the other one of the adjacent links to allow the adjacent links to pivot relative to each other and to move longitudinally relative to each other.

4. An apparatus for restraining an occupant in a seat of a vehicle, said apparatus comprising:

an arm movable from a fully stowed position adjacent one side of the seat toward the occupant to restrain the occupant in the seat and movable away from the occupant to the fully stowed position;

a latch assembly carried by one end of said arm and including a tongue receivable in and latchable with a buckle assembly;

a buckle assembly movable toward said latch assembly carried by said one end of said arm and for receiving said tongue to locate said one end of said arm on one side of the seat;

first actuatable motor means for, when actuated (i) moving said arm toward and from the fully stowed position, and (ii) moving said latch assembly toward and from said buckle assembly; and second actuatable motor means separate from said first actuatable motor means and for, when actuated, moving said buckle assembly toward said latch assembly as said latch assembly moves toward said buckle assembly, said first and second actuatable motor means being actuatable independently of each other.

5. An apparatus for restraining an occupant in a seat of a vehicle as defined in claim 4 wherein said arm includes (i) a plurality of links, and (ii) means associated with each pair of adjacent links and for interconnecting an end of one link with an end of the other link to enable relative end-to-end movement of the adjacent links as said arm moves from the fully stowed position toward the occupant.

6. An apparatus for restraining an occupant in a seat of a vehicle as defined in claim 4 wherein said first actuatable motor means includes a motor-driven linear actuator operatively coupled with said arm.

7. An apparatus for restraining an occupant in a seat of a vehicle as defined in claim 6 wherein said second actuatable motor means includes a motor-driven linear actuator operatively coupled with said buckle assembly.

8. An apparatus for restraining an occupant in a seat of a vehicle, said system comprising:

an arm movable from the occupant and movable toward the occupant to restrain the occupant in the seat, said arm having two ends and a length;

a latch assembly carried by one end of said arm and including a tongue receivable in and latchable with a buckle assembly;

a buckle assembly movable toward said latch assembly carried by said one end of said arm and for receiving said tongue to locate said one end of said arm on one side of the seat; and said arm including (i) a first strap having one end connected to said one end of said arm and an opposite end connected to said buckle assembly, and (ii) a second strap having one end connected to said one end of said arm and an opposite end for being connected to part of the vehicle, said first and second straps extending along the length of said arm;

first actuatable means for, when actuated, moving said buckle assembly toward said latch assembly and causing tension to be applied to said first strap; and second actuatable means for, when actuated, allowing slack to be formed in said second strap as tension is being applied to said first strap in response to said buckle assembly moving toward said latch assembly and allowing said arm to move toward the occupant to restrain the occupant in the seat.

9. An apparatus for restraining an occupant in a seat of a vehicle as defined in claim 8 wherein said first actuatable means includes a motor-driven linear actuator operatively coupled with said arm.

10. An apparatus for restraining an occupant in a seat of a vehicle as defined in claim 9 wherein said second actuatable means is separate from said first actuatable means and includes a motor-driven linear actuator operatively coupled with said buckle assembly.

* * * * *

UNITED STATES PATENT AND TRADEMARK OFFICE
CERTIFICATE OF CORRECTION

PATENT NO.  : 5,286,091
DATED       : February 15, 1994
INVENTOR(S) : Craig A. Busch It is certified that error appears in the above-identified patent and that said Letters Patent is hereby corrected as shown below:

Column 8, line 21, delete "An apparatus" and insert --A system--.

Column 8, line 50, delete "An apparatus" and insert --A system--.

Column 8, line 54, delete "An apparatus" and insert --A system--.

Signed and Sealed this

Ninth Day of August, 1994

Attest:

BRUCE LEHMAN

Attesting Officer

Commissioner of Patents and Trademarks